United States Patent [19]

Peterson

[11] Patent Number: 5,579,163

[45] Date of Patent: Nov. 26, 1996

[54] METHOD AND APPARATUS FOR PRODUCING SPECTRAL DISPLAYS

[76] Inventor: Jeffrey M. Peterson, 3442 Richland Dr. No. 7, Santa Barbara, Calif. 93105

[21] Appl. No.: 363,539

[22] Filed: Dec. 23, 1994

[51] Int. Cl.$^6$ .................................................. G02B 5/04
[52] U.S. Cl. ........................... 359/591; 359/596; 359/831; 359/457
[58] Field of Search ..................... 359/591, 592, 359/593, 596, 831, 832, 833, 834, 835, 836, 837, 457; 362/331

[56] References Cited

U.S. PATENT DOCUMENTS

| | | | |
|---|---|---|---|
| 583,594 | 6/1897 | Ewen . | |
| 595,257 | 12/1897 | Basquin . | |
| 595,272 | 12/1897 | Soper . | |
| 767,799 | 8/1904 | Cummings . | |
| 5,146,364 | 9/1992 | Ohu | 359/837 X |
| 5,191,485 | 3/1993 | Kahle | 359/834 |
| 5,247,491 | 9/1993 | Kwiathowski | 359/833 X |
| 5,471,348 | 11/1995 | Miller et al. | 359/837 |

FOREIGN PATENT DOCUMENTS

1148677  4/1969  Switzerland ..................... E06B 9/24

*Primary Examiner*—Michael L. Gellner
*Assistant Examiner*—D. P. Malley
*Attorney, Agent, or Firm*—Leo F. Costello

[57] ABSTRACT

A method and apparatus for projecting multiple patches of full spectrum, rainbow colors to multiple, widely distributed locations is provided. The invention enables the display of such patches on a surface area toward which a source of light is directed, for example the walls and ceiling of a room from sunlight entering the room through a window in the room. The method and apparatus provide first for the refraction of the light from the source of light, and secondly for both the refraction and the reflection of the initially refracted light. The initially refracted light is projected onto a surface of the room as main multiple spectral patches; and the refracted-refracted light, and the reflected-refracted light are projected onto other surfaces of the room laterally of the main patches as additional spectral patches, creating in all, multiple spectral displays of full spectrum, rainbow colors nearly surrounding a viewer and changing in position and shapes with the movement of the sun or other light source.

24 Claims, 8 Drawing Sheets

METHOD AND APPARATUS FOR PRODUCING SPECTRAL DISPLAYS

FIELD OF THE INVENTION

This invention pertains to a spectral displaying method and apparatus and more particularly to the projection of a multiplicity of spectral patterns to multiple locations.

BACKGROUND

The display of spectral colors is a very appealing and satisfying experience for most people. The urge to view a rainbow is an example of how such spectral displays always seem to be an attraction to the human psyche. Furthermore, the use of spectral colors in advertising indicates how such displays create positive feelings of well being.

It has long been known that simple prisms can be used to produce the spectra from white or polychromatic light and vice versa, and such prisms are commonly used for scientific and educational purposes in science labs. In addition, scientific and industrial uses of spectrometry are well known. Also, the prism effect has been created with pieces of cut glass used in light fixtures as decorative pendants, in glassware, and the like.

These known devices using prisms to display the spectra, however, have not facilitated a more common enjoyment of spectral displays. No device or apparatus is known which can project multiple patches of full spectrum, rainbow colors to multiple locations. Thus, the known spectral displaying devices do not lend themselves to the relatively easy and inexpensive display of spectral colors in a room in an attractive and pleasing manner.

SUMMARY

The present invention is directed to a method and apparatus for projecting multiple patches of full-spectrum, rainbow colors to multiple locations. Utilizing the principles of the present invention enables the display of such patches on a surface area, for example the walls, ceiling, and floor of a room, from sunlight entering through a window in the room. The method and apparatus provides first for the refraction of the light from the source of light, and secondly for both the refraction and the reflection of the initially refracted light. The initially, once-refracted light is projected onto a predetermined surface of the room, such as a wall, as multiple spectral patches; and the reflected-refracted light and the refracted-refracted light are projected onto other nearby surfaces, such as adjacent room walls, as additional spectral patches. In all, multiple full-spectrum, rainbow colored patches are displayed on several surfaces around a viewer in a pleasing and attractive manner.

It is an object of the present invention to create and to project multiple spectral displays.

It is another object to project multiple patches of full spectrum, rainbow colors to multiple locations.

Another object is provide for the adjustment of the position of multiple spectral patches which are projected to multiple locations.

An additional object is to enable the widespread distribution of multiple spectral patches to multiple locations on several surfaces which are on several sides of a viewer.

It is further object of this invention to provide multiple spectral displays in a room from sunlight entering the room through a window thereof.

It is yet another object to produce multiple spectral patches from sunlight or other light sources and to project the patches onto a surface in such a manner that the patches change their shapes and positions in response to changes in the position of the source of light.

It is still another object to facilitate the placement in the path of sunlight of a plurality of prisms which are oriented in such a manner as to disperse the sunlight into multiple patches of rainbow colors and to project and display these patches over a relatively wide area of a surface in front of the prisms.

It is a further object of this invention to arrange prisms in a spectral displaying apparatus so that light directed at the prisms will be dispersed into multiple, spaced, non-overlapping spectral patches in front of the prisms.

It is a still further object of this invention to arrange prisms in a spectral displaying apparatus so that light directed at the prisms will first be refracted by the prisms with part of the refracted light being projected to provide multiple, once-refracted spectral patches; with part of the refracted light being reflected to provide multiple, reflected-refracted, spectral patches; and with another part of the refracted light being again refracted to project multiple, twice-refracted, spectral patches.

It is a further object of this invention to arrange prisms in a spectral displaying apparatus so that light directed at the prisms will be dispersed laterally of the prisms into multiple, spaced, non-overlapping spectral patches at symmetric or asymmetric heights relative to the prisms.

It is feature of this invention to provide a spectral displaying apparatus including a plurality of prisms which produce multiple spectral patches on the walls of a room from sunlight entering the room and to enable the location of the patches to be varied as a function of the position of the sun in the sky and the arrangement of the prisms.

Still another object of this invention is be able to project a very large number of patches of full-spectrum, rainbow colors to multiple locations in a room, for example as many as fifty-two or more separate patches.

These and other objects, features, and advantages of the subject invention will become apparent upon reference to the accompanying drawings, the following description, and the appended claims.

DETAILED DESCRIPTION

Figure 1:
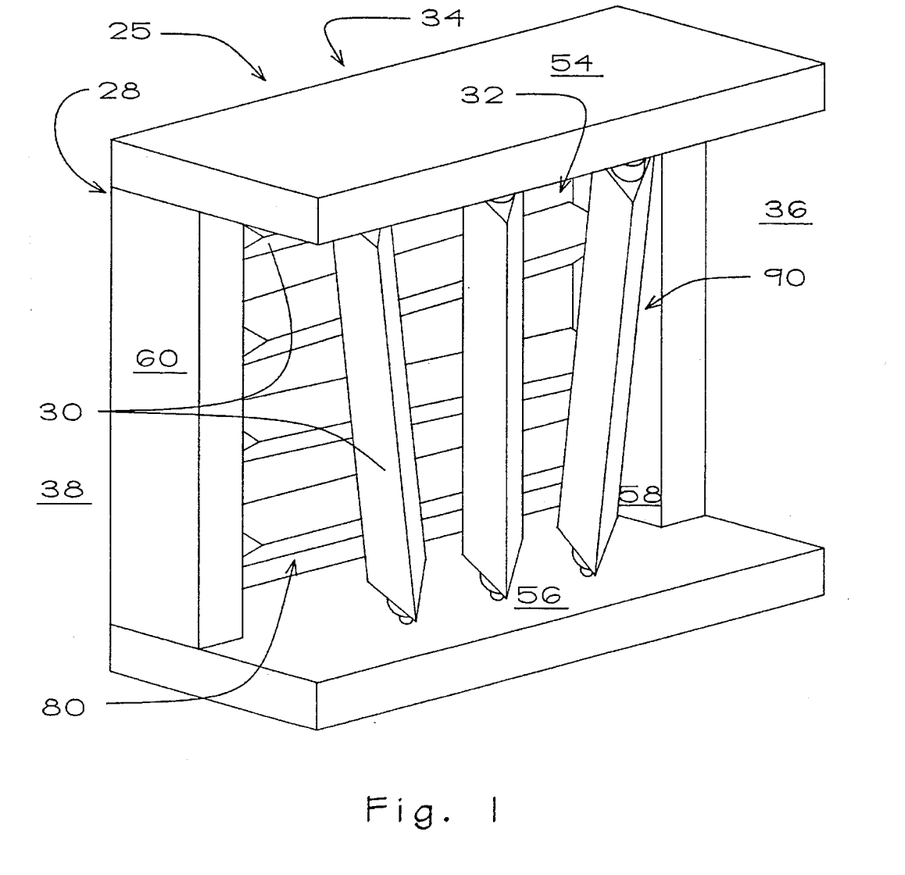
FIG. 1 is an isometric view of an embodiment of a spectral displaying apparatus in accordance with the present invention.

One embodiment of a spectral displaying apparatus incorporating the principles of the present invention is shown in FIG. 1 and is identified by the numeral 25. In general, the apparatus includes a rectangular frame 28 and a plurality of prisms 30 mounted in the frame in a manner to be described. It will be helpful at the outset to provide certain terms of reference. Thus, in FIG. 1, the front and back of the apparatus are designated by the numerals 32 and 34, and the left and right sides of the apparatus are designated by the numerals 36 and 38. The designation of "left" and "right" is thus seen to be from a position at the back of the apparatus looking toward the front. Use of such words as "front," back," "left," "right," "top," and "bottom" are convenient terms to use in describing the apparatus and its preferred orientation, as shown in FIG. 1, but the invention is not limited to such an orientation, and use of these terms is not to be interpreted as limiting the use of the apparatus to such orientation.

Figure 2:
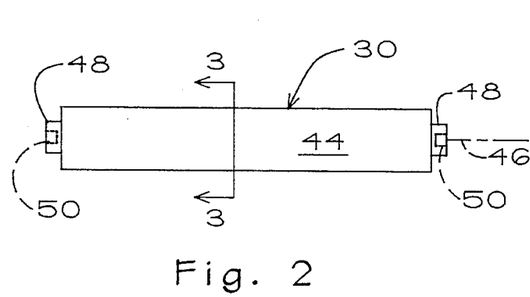
FIG. 2 is a side view of a prism as used in the embodiment shown in FIG. 1.
Figure 3:
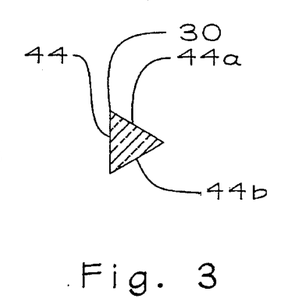
FIG. 3 is a cross-section taken along line 3—3 in FIG. 2.

The prisms 30, per se, are first described. All the prisms utilized in the embodiment of FIG. 1 are identical, and thus detailed description of one of them, as shown in FIGS. 2 and 3, will suffice for all. In the preferred embodiment, each prism is an equilateral prism and is an elongated, translucent piece of optical material. The prisms can be made of any suitable optical material whether it be optical glass or optical grade polymer, that is, plastic. In the preferred embodiment, prisms were acquired from the Edmund Scientific Company at 101 E. Gloucester Pike in Barrington, N.J. 08007-1380, their catalog part No. F31,799, but other prisms from other sources can of course be used. The prism thus has an equilangular triangular cross-section and provides three rectangular faces 44 which are equally radially spaced from a longitudinal axis 46 of the prism and meet in edges of the prism. The prism has opposite ends from which project journal pieces 48, with each journal piece having a hole 50 drilled axially of the prism.

Each prism 30 has the well-known characteristic of being able to refract light passing through it. Thus, white or polychromatic light directed at a face, as 44a, will pass through the prism and emerge from an opposite face, as 44b, in a dispersion of the rainbow colors, that is the full colors of the spectrum, in accordance with the laws of physics. Also, each prism has the characteristic of reflecting incident light impinging on a face thereof, with the angle of reflection equaling the angle of incidence, as is well, known.

Although the invention is not limited to particular dimensions, the prisms 30 (FIG. 2) used in the described embodiment are approximately 6" long with the journal pieces 48 adding about 3/16" to each end, and the width of each face 44 is about 13/16". These dimensions are by no means critical to the invention, nor is the use of prisms of the same length and width, such data being given by way of example only.

Figure 9:
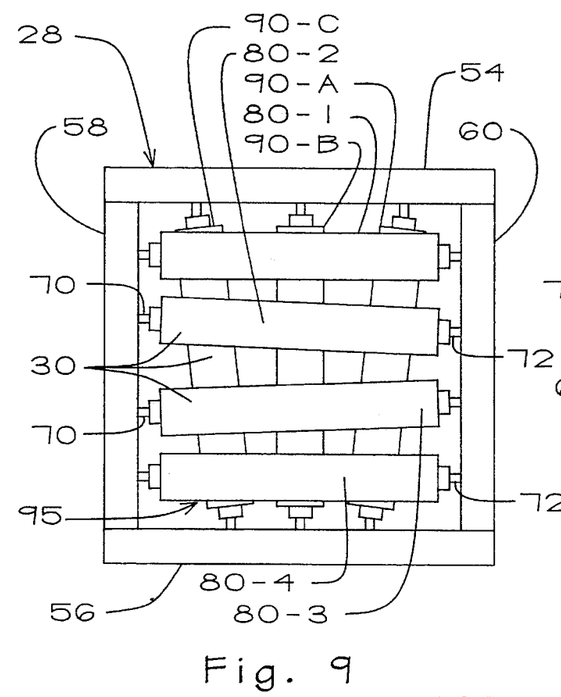
FIG. 9 is an elevation of the spectral displaying apparatus shown in FIG. 1 but drawn from what is referred to as the rear of the apparatus in the present description.

The frame 28 shown in the apparatus 25 in FIG. 1 serves as a convenient way of mounting the prisms 30, but the invention is not limited to the specific frame shown and described, as will be subsequently understood. The frame 25 is generally square in outline (FIG. 4 and 9) and has rectangular top and bottom panels or plates 54 and 56 each of approximately the same length and width. The frame also has left and right side panels or supports 58 and 60 each of about the same length and width but less than the width of the top and bottom panels. As an example, but again not limiting to the invention, all the panels of the described embodiment are 7" long, the top and bottom panels are 3½" wide, and the left and right panels are 1½" wide.

The side panels 58 and 60 of the frame 28 (FIGS. 1, 4 and 9) are in spaced parallel relation to each other, extend between the top and bottom panels 54 and 56, and join the same in spaced parallel relation. Because the side panels are narrower than the top and bottom panels, the front edges of the side panels are set back from the front edges of the top and bottom panels to allow space for a wide angle of light projection as will be more fully understood as the description proceeds. As such, the panels define a generally square opening in which the prisms 30 are positioned. In the subject embodiment, therefore, the opening is about 7" square.

Figure 6:
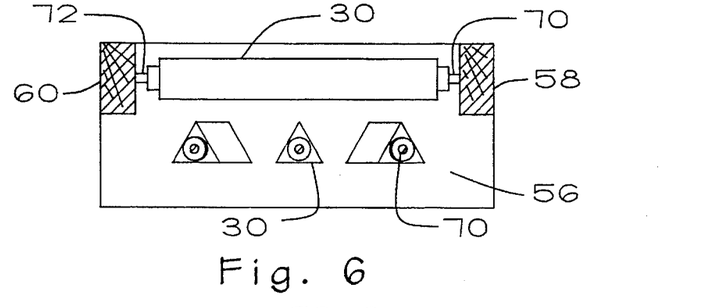

The left side panel 58 (FIGS. 9 and 10) provides four mounting sockets 64 bored in and spaced along the inside surface of the left panel, and the right side panel 60 also provides four adjusting sockets 68 bored in and spaced along the inside surface of the right panel. The axes of these sockets are generally parallel to the top and bottom panels, and all of the sockets in the side panels are located in a common plane toward the rear of the frame 28 (see FIG. 6, for example). The top and bottom adjusting sockets are the two opposite pairs of intermediate sockets are misaligned, as will be understood from FIGS. 9 and 10. That is, the intermediate adjusting sockets are spaced relatively closer together than their opposite pair of intermediate mounting sockets. Fixed mounting trunnions 70 project from each mounting socket 64, and adjustable, mounting trunnions 72 are axially slidably mounted in the adjusting sockets 68.

It is to be understood that the adjusting sockets 68 (FIG. 10) are drilled long enough to accommodate axial sliding of the adjustable trunnions 72 between positions almost entirely retracted within their sockets and positions projecting from their sockets like the fixed trunnions 70. Each fixed trunnion, however, is immovably held, as by gluing, in its socket. Such construction facilitates mounting of the prisms 30 in the frame 28, as will be described.

The top and bottom panels 54 and 56 (FIG. 4) respectively have three mounting and three adjusting sockets 74 and. 78 bored in the forward portions of their inside surfaces. The axes of these sockets are generally parallel to the side panels 58 and 60, and all of the sockets in the top and bottom panels are located in a common plane which is spaced forwardly of the plane of the sockets 64 and 68 in the side panels 58 and 60 (see FIG. 7, for example). The intermediate mounting socket is axially aligned with the intermediate adjusting socket, but the opposed pairs of outside mounting and adjusting sockets are not aligned since the adjusting sockets are spaced inwardly of the mounting sockets.

Figures 4, 5, 7, 8:
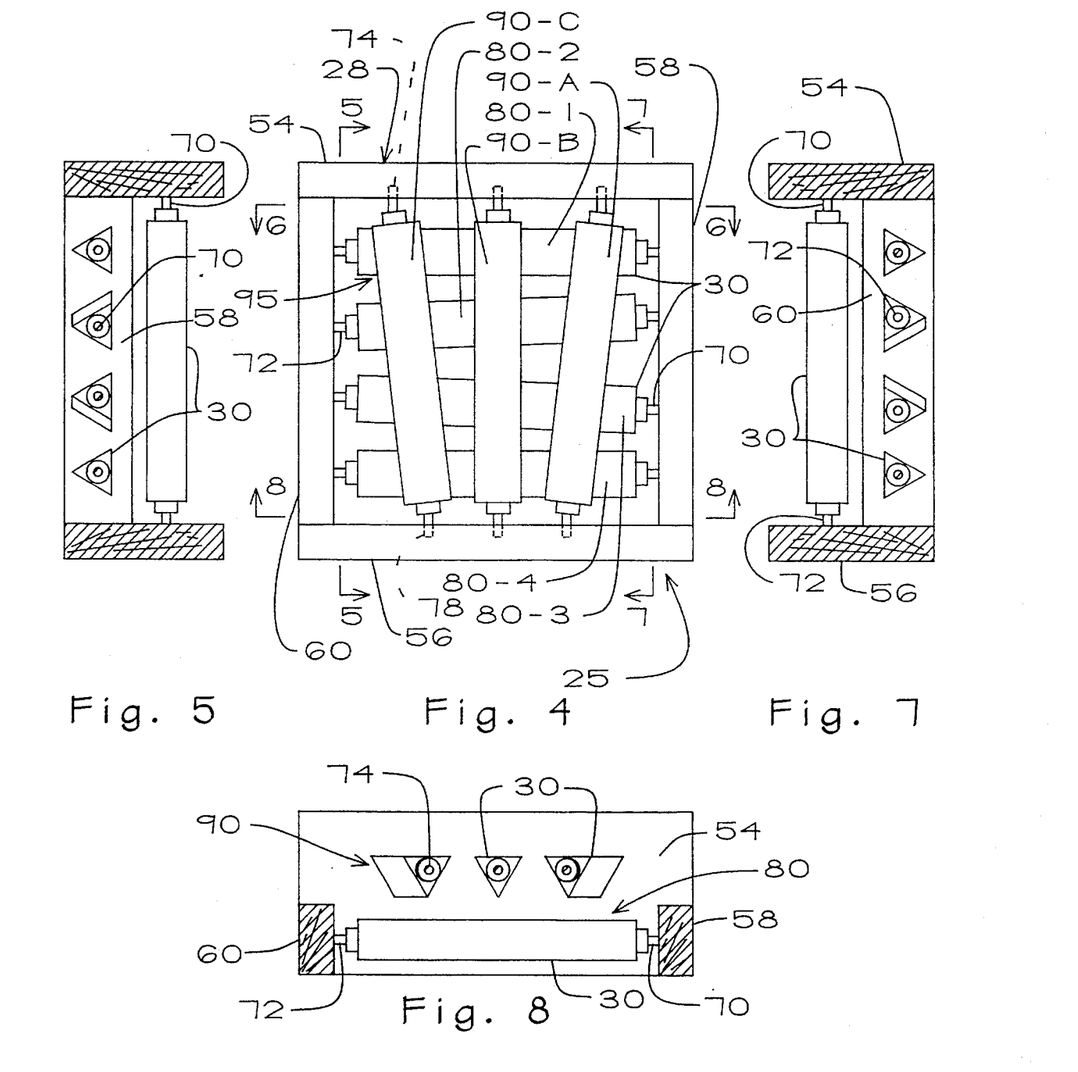
FIG. 4 is an elevation of the spectral displaying apparatus shown in FIG. 1 drawn from what is referred to as the front of the apparatus in the present description.
FIGS. 5, 6, 7, and 8 are cross-sections taken along their respective lines 5—5, 6—6, 7—7, and 8—8 in FIG. 4.
Figure 10:
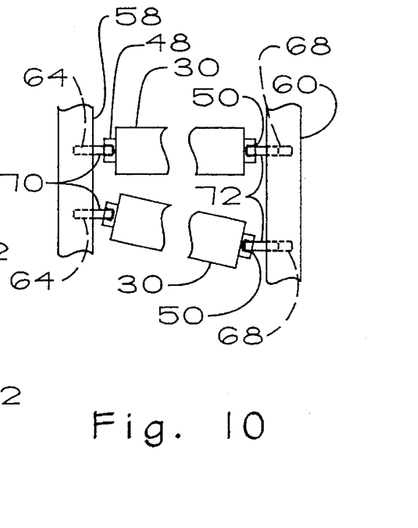
FIG. 10 is a detail showing how the prisms are mounted in the frame of the spectral displaying apparatus of FIG. 1 but with the prisms foreshortened.

Fixed and adjustable trunnions 70 and 72 like those shown in FIG. 10 project from the sockets 74 and 78 (FIG. 7). The fixed trunnions are secured in their sockets and project downwardly from the top panel 54 (like the fixed trunnions in the side panels 58), whereas the adjustable trunnions are axially slidable in their sockets (like the adjustable trunnions in the side panels 60) and project upwardly from the bottom panel 56. The intermediate trunnions (FIG. 4) are axially aligned, vertically when the apparatus has the orientation of FIG. 1, but the outside fixed and adjustable trunnions are not so aligned. Because of the locations of the outside sockets 74 and 78, the outside adjustable trunnions are spaced closer to their intermediate adjustable trunnion than the outside fixed trunnions are to their intermediate fixed trunnion.

The embodiment of the apparatus shown in FIG. 1 includes a primary group 80 of four prisms 30 mounted on and between the side panels 58 and in the following manner. First, the adjustable trunnions 72 on the side panels are retracted. Then, the prisms 30 are inserted one-by-one between opposite pairs of fixed and adjustable trunnions 70 and 72, the journal holes 50 at the adjacent ends of the prisms are fitted over the fixed trunnions, and finally, the adjustable trunnions are slid into their respectively adjacent journal holes. Thusly mounted, each prism is individually rotatably adjustable on its trunnions so that the position of the faces 44 of each prism can be independently angularly adjusted thereby to enable adjustment of the angle of projection of reflected and refracted light.

From the foregoing, it will be understood that the top and bottom prisms 30 of the primary group 80 (FIGS. 1 and 9) are generally parallel to each other and to the top and bottom panels 54 and 56. When the apparatus 25 is used in its preferred orientation, as shown in FIG. 1, the top and bottom prisms are horizontal, or very nearly so. The intermediate primary prisms 30, however, are not parallel, either to each other or to the top and bottom prisms. Instead, for reasons to be explained, the intermediate prisms are in a convergent-divergent relation to each other. In the embodiment shown and described, the deviation of the intermediate primary prisms from parallelism is less than about ten degrees, it being understood that this angle is not critical.

The apparatus 25 (FIG. 1) also provides a secondary or post group 90 of three prisms 30 mounted on and between the top and bottom panels 54 and 56. The mounting of the secondary prisms is similar to the mounting of the primary prisms. Thus, each prism in the secondary group (FIG. 4) is mounted on a pair of opposed fixed and adjustable trunnions 70 and 72 in the top and bottom panels 54 and 56. The intermediate prism of the secondary group is thus generally parallel to the side panels 58 and 60 and is in a very nearly exactly vertical position when the frame 28 is in the preferred orientation of FIG. 1. The outside prisms of the secondary group, however, are in a convergent-divergent relation to each other. As an example, but not limiting to the invention, the angle of deviation of the outside secondary prisms from parallelism is less than about ten degrees.

From the foregoing, it will be understood that the prisms 30 in the secondary group 90 lie in a plane which is in spaced parallel relation to the plane containing the prisms of the primary group 80 (FIG. 8, for example). Moreover, the prisms in the secondary group are in opposed spaced relation to the prisms in the primary group, in a grid pattern, and define a plurality of overlaps or overlapping junctures 95 (FIGS. 4, 9 and 18), twelve in the embodiment of FIG. 1.

To describe the operation of the subject apparatus 25, it will be helpful to assign the prisms 30 in the primary and secondary groups 80 and 90 with individual reference characters. Thus, the prisms (FIGS. 4 and 9) in the primary group, from top to bottom, are hereinafter designated as 80-1, 80-2, 80-3, and 80-4; and the prisms in the secondary group, from left to right, are designated as 90-A, 90-B, and 90-C.

The apparatus 25 is normally used in a building, as 100 (FIG. 11 ), which provides a room 102 and a window 104 having an exposure to the sun, schematically represented by the numeral 106. Again, for convenient reference, the room has a front wall 108, a back wall 110, a left side wall 112, a right side wall 114, a ceiling 116 and a floor 118. It is to be noted that both the ceiling and floor are also walls, so depending on the context, when the term "wall" is used in a general sense in the specification or claims, it is intended to encompass all the surfaces which define the room.

In its preferred use, the subject spectral displaying apparatus 25 (FIGS. 1 and 11) is placed in a window, as 104, with the bottom panel 56 of the frame 28 resting on the window sill. In this position, the rear 34 of the apparatus and thus the primary group 80 of prisms 30 are on the outside, that is facing the outdoors, and the front 32 and thus the secondary group 90 are on the inside facing the room 102. When the sun 106 is shining on the apparatus, five groups of spectral displays 120, 122, 124, 126, and 128 (FIG. 11) are projected into the room. These displays include a main or principle spectral display 120 projected on the wall 108 generally in front of the apparatus; upper and lower, left spectral displays 122 and 124 projected on the wall 112 laterally to the left of the apparatus; and upper and lower, right spectral displays 126 and 128 projected on the wall 114 laterally to the right of the apparatus. Each of these displays will be explained in greater detail, but at this point, they are generally represented by the boxes in FIG. 11, it being understood that the lines defining the boxes are not part of any display but are used herein merely to show the locations of the displays.

The locations of the groups of displays 120, 122, 124, 126 and 128 (FIG. 11 ) on the walls, as 108, 112, and 114, of the room 10:2 will vary with the position of the sun 106 in the sky. When the sun moves upwardly in the sky from sunrise to noontime, the color displays move on the walls in the direction from the ceiling to the floor. As the sun moves downward in the sky from noontime to sunset, the color displays move on the walls in the direction from the floor to the ceiling. Moreover, at mid-morning or mid-afternoon, the main display will appear on the front wall 108 opposite the window 104 and thus in front of the apparatus 25, and the left and right displays will appear on the left and right walls 112 and 114 laterally and forwardly of the apparatus and generally opposite to the corresponding display on the opposite wall.

Before describing each of the spectral displays 120, 122, 124, 126 and 128 (FIG. 11) in greater detail, it is helpful to explain three important principles involved and in so doing to explain the methodology involved. The first principle pertains to the main spectral display, shown by a dashed line box 120 (FIG. 12) and to the arrangement of the prisms 80-1, 80-2, 80-3, and 80-4 of the primary group 80. This main display includes four full-spectrum patches 120-1, 120-2, 120-3 and 120-4 spaced on the wall in a roughly cross-shaped pattern and illustrated in the drawings as being within the box 120. To create the cross-shaped pattern, and as has been explained, the two intermediate prisms 80-2 and 80-3 are intentionally non-parallel. With reference to FIG. 12, if the primary prisms were all parallel to each other, as indicated by the phantom prisms 80-2 and 80-3, a significant overlap of the spectral patches would occur, as represented by the phantom boxes 120-2 and 120-3 in FIG. 12. In fact, if the spectral patches were allowed to overlap in any significant way, the result would be mostly white light recreated on the wall. To prevent any overlap, or at least any significant overlap, of the patches, and to create the cross-shaped pattern, the intermediate primary prisms 80-2 and 80-3 are in the convergent-divergent relationship, i.e. non-parallel or staggered, as described and as shown in full lines in FIG. 12. Thus, the purpose of this convergent-divergent mounting of the primary prisms is to spread the spectral patches so as to form separate full rainbow-colored patches.

Figure 13:
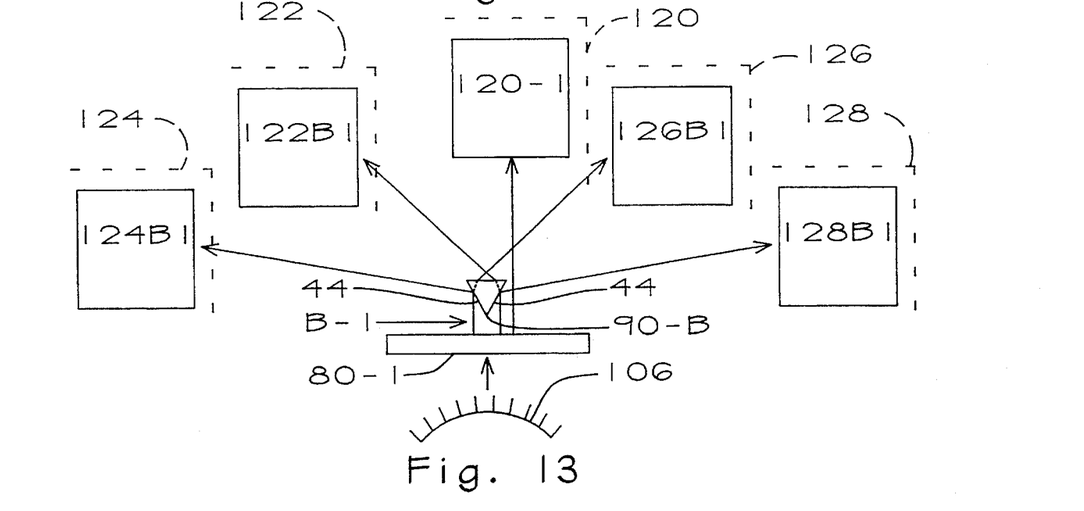
Figure 18:
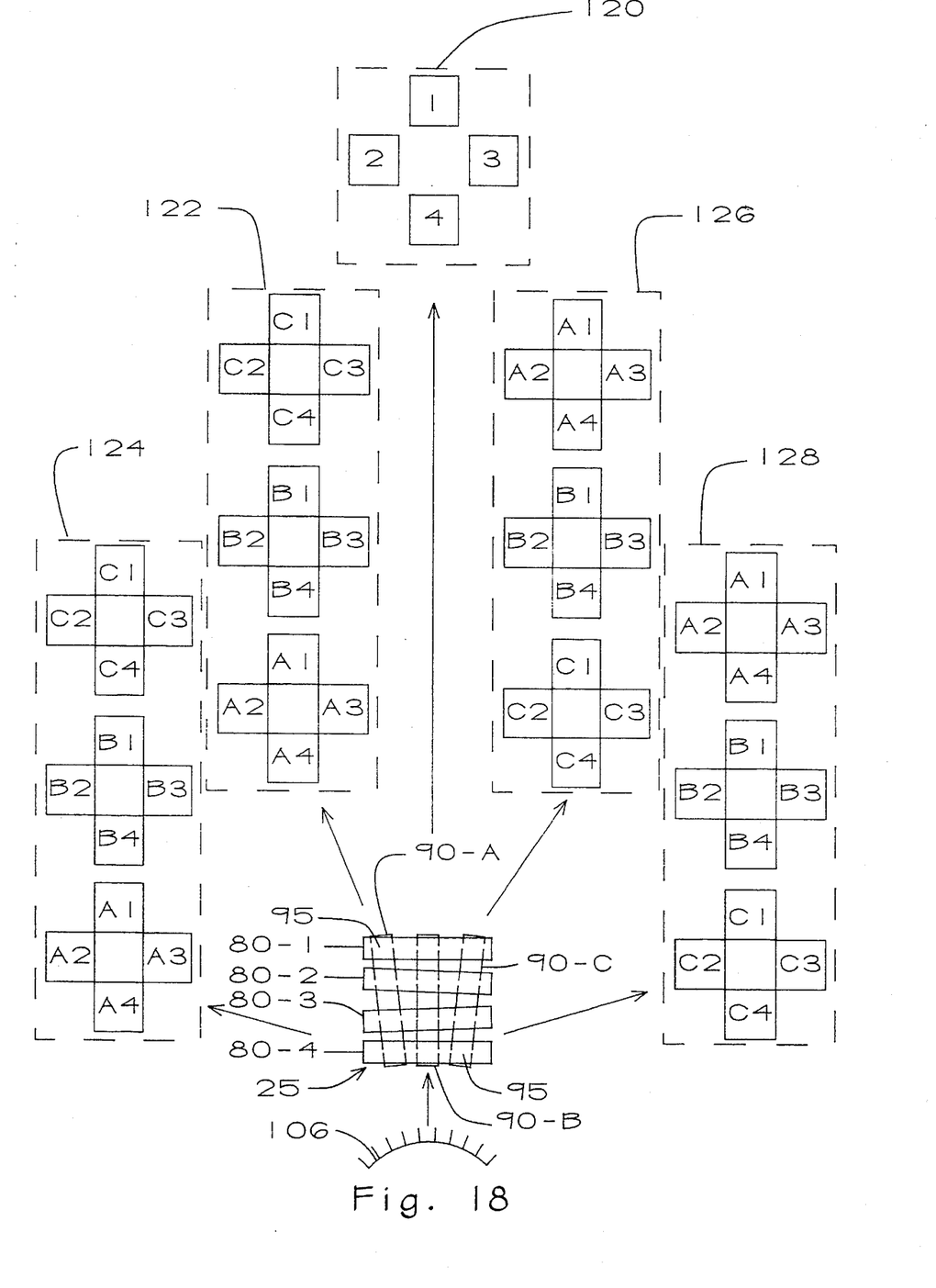
FIG. 18 is a schematic view of the apparatus of FIG. 1 and of the fifty-two full-spectrum patches which can be created with said apparatus, it being understood that the main purpose of this view is to identify each spectral patch with its origin at the prisms. Although this view shows, in general, the relative locations of the patches, it is not intended to show their exact to locations relative to each other and the prisms.

An important second principle pertains to the overlapping junctures 95 of the primary and secondary prisms 80-1 to 80-4 and 90-A to 90-C, as best illustrated in FIG. 13 but also schematically shown in FIG. 18. At this point, it will be helpful to identify each of the junctures with its unique reference character. Referring to FIG. 18, the primary prisms are thought of as being rows 1 through 4, the secondary prisms as being columns A through C, and the overlapping groups 80 and 90 as being a matrix, so that the junctures 95 are identified by their row and column designations. Thus, in FIG. 18, the upper right juncture 95 is identified as juncture "C1", the lower left juncture as "A4", and so on.

With the foregoing references in mind, FIG. 13 shows a plan view of a single primary prism, as 80-1, and a single secondary prism, as 90-B, together defining a single juncture or overlap B 1. When the apparatus 25 is exposed to sunlight, as described above, the primary prism 80-1 refracts the rays of sunlight striking this prism. Part of this refracted light is projected, as indicated by the straight ahead arrow, extends away from the prism 80-1 to form one of the spectral patches 120-1 of the main display 120, as previously described in explaining FIG. 12. However, other parts of this refracted light will be converted by the secondary prism 90-B and projected as indicated by the laterally projecting arrows into four distinct, full spectrum, spectral patches 124B1, 122B1, 126B1 and 128B1, each of which is part of the spectral displays 124, 122, 126, and 128, respectively FIG. 11.

These four patches 124B1, 122B1, 126B1, and 128B1 (FIG. 13) are achieved as follows: Both the left and right faces 44 of the secondary prism 90-B act as mirrors, and part of the refracted light from the primary prism 80-1 is reflected by these faces to the left and to the right. These projections of the reflected-refracted light are identified as 124B1 and 128B1. Not all the light is thusly reflected, however, and a substantial portion enters the left and right faces of the secondary prism, resulting in the refracted light being refracted a second time and emerging from the front faces of the secondary prism. These projections of the twice-refracted light are referred to as left and right, refracted-refractions 122B1 and 126B1, respectively. In general, the refracted-refractions are brighter than the reflected-refractions.

From this explanation of the first and second principles (FIGS. 12 and 13), it will be understood that each primary prism 80-1 to 80-4 is responsible for one main spectral patch, as 120-1, and that each juncture 95 of the primary and secondary prisms 80-1 to 80-4 and 90-A to 90-C is responsible for two left and two right patches, that is four patches in all.

Figure 14:
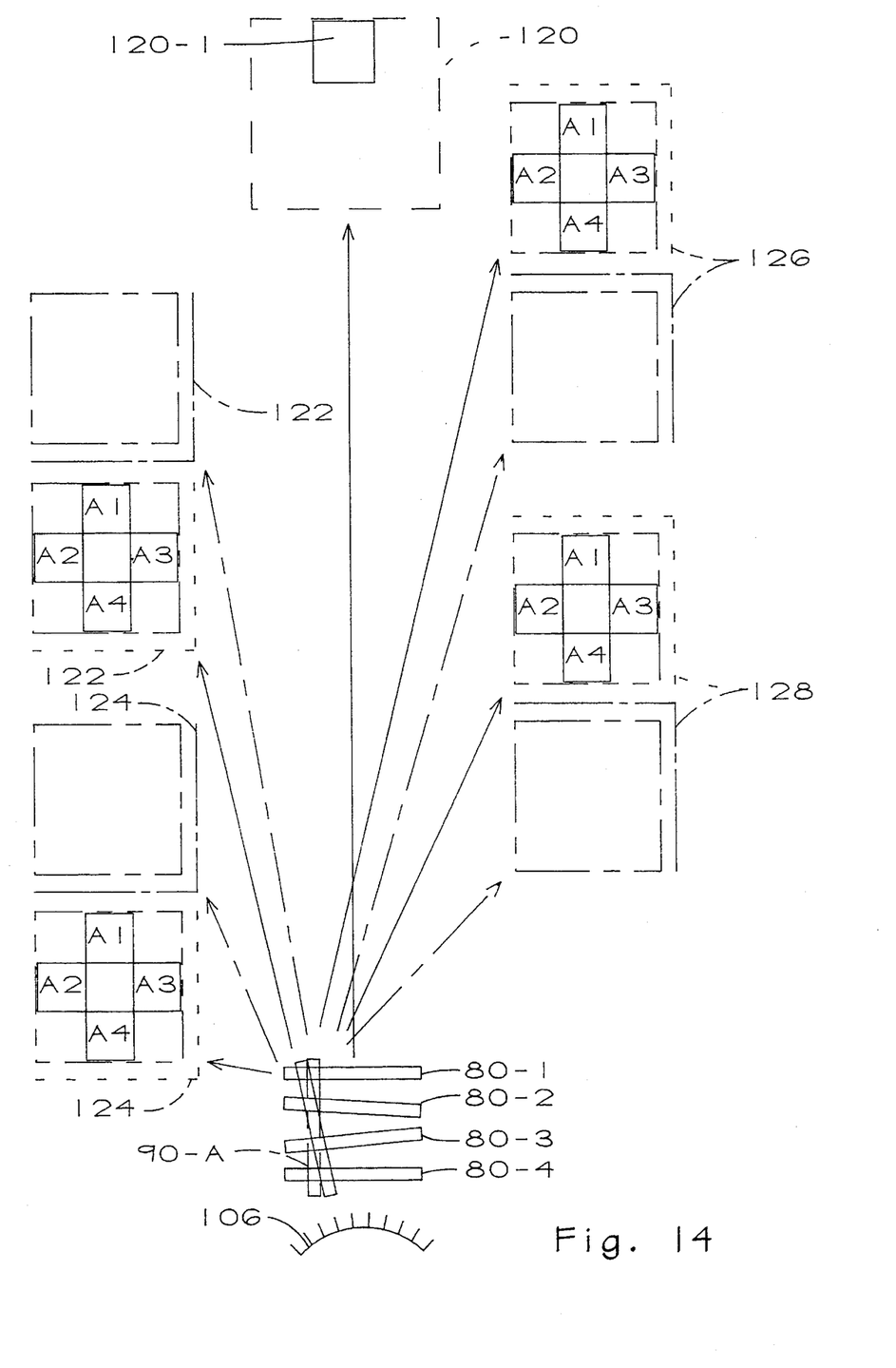

The third principle pertains particularly to the arrangement of the prisms 90-A to 90-C in the secondary group 90, and to describe this principle, reference is made to FIG. 14. Just as it is important for the prisms 30 in the primary group 80 not to be all parallel, as above explained, the secondary prisms must not be all parallel. In FIG. 14, a rear elevational schematic of the four primary prisms 80-1 to 80-4 and a single secondary prism, as 90-A, is shown. Assume again that the apparatus 25 is positioned in a window, as 104, as previously described. Further assume that the single secondary prism were vertical, as shown in phantom lines. Under these conditions, the corresponding spectral patches 124A1–A4, 122A1–A4, 126A1–A4, and 128A1–A4 emanating from the junctures A1–A4 would be projected onto the walls, as 112 and 114, in a symmetrical arrangement, as shown in phantom line boxes. By symmetrical is meant that the boxes 122 and 126 are equally spaced from the floor 118, and boxes 124 and 128 are equally spaced from the floor. Now, if the single secondary prism 90-A is tilted, as shown in solid lines, the upper and lower spectral patches on the left side are moved downwardly, and the upper and lower spectral patches on the right side are moved upwardly, all as shown in solid lines, which is referred to as an asymmetrical arrangement.

The foregoing description has referred to the five spectral displays 120, 122, 124, 126, and 128 (FIGS. 11 to 14) produced by the described embodiment of the spectral displaying apparatus 25 of the present invention. Each of these displays is composed of spectral patches, as for example, a main spectral patch 120-1, a left refracted-refracted spectral patch 122A1, a left reflected-refracted spectral patch 124A1, a right refracted-refracted spectral patch 126A1, and a right reflected-refracted spectral patch 128A1.

Figure 15:
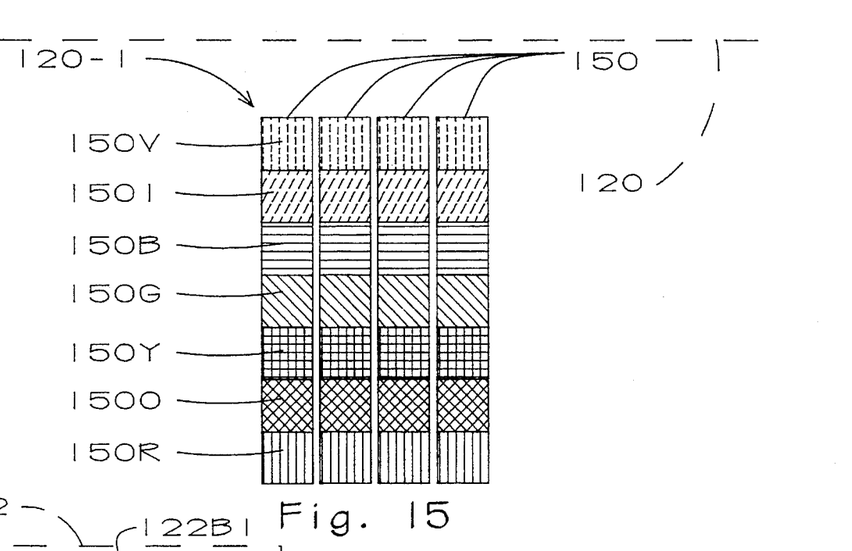
FIGS. 15, 16 and 17 are representations of individual spectral patches created by the subject apparatus.

One of the main spectral patches 120-1 is shown in FIG. 15. Each such patch includes a plurality of side-by-side columns 150, and each column is composed of a full spectrum of rainbow-colored segments, as 150R, 150O, 150Y, 150G, 150B, 150I, and 150V, with the letters representing red, orange, yellow, green, blue, indigo and violet, the colors of the spectrum. Of all the spectral patches produced by the subject apparatus 25, the main spectral patches are the largest and the brightest. It is to be understood that the shape and size of the patches in FIG. 15 are only general representations of these parameters of the actual patches. The actual shape and size of each column in the patch and of each color segment changes with the angle of incidence of the source of light striking the primary prisms 80-1 to 80-4. If the apparatus is used in a window, as 100, the shape and size of each patch varies with the position of the sun in the sky, the length of the columns stretching and contracting as the sun rises and sets.

It is believed understood that in the main display 120, there are four patches 120-1, 120-2, 120-3, and 120-4, each like 120-1 shown in FIG. 15, one for each primary prism 80-1 through 80-4, that is assuming the embodiment shown in FIG. 1 is employed. It is believed further understood that these patches are arranged in a cross-shaped pattern, as previously described. This entire display of four patches will move on the displaying surface, as wall 108, as a function of the angle of incidence of the light source. Thus, as sun rises and sets, the spectral patches change their shapes, and the displays of patches move, thereby creating a gradually and continually changing visual effect.

Figures 16, 17:
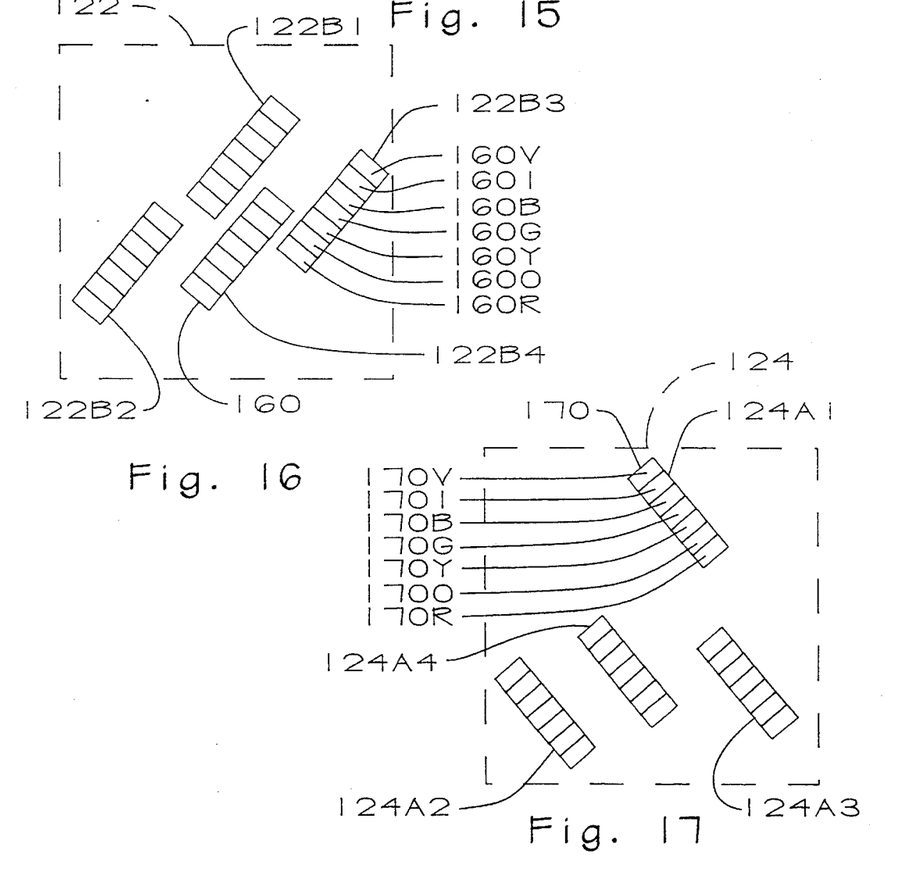

As above stated, the main patches 120-1 through 120-4 are the largest and brightest. Next in brightness and size are the refracted-refracted spectral patches, for example the upper left patches 122B1 through 122 B4 (FIG. 16). Each refracted-refracted patch is a single column 160 of full-spectrum, rainbow-colored segments, as 160R, 160O, 160Y, 160G, 160B, 160I, and 160V, with the letters representing red, orange, yellow, green, blue, indigo and violet, as before. Shown in FIG. 16 is a grouping of refracted-refracted patches emanating from the junctures B1, B2, B3, and B4 of the primary prisms 80-1 through 80-4 and the intermediate secondary prism 90-B. These four patches as produced by the embodiment of FIG. 1 are spaced from each other in generally the pattern shown in FIG. 16. Like the main patches, these refracted-refracted patches change their shapes and move along with their displays, as 122, as a function of the angle of incidence of the sun or other light source, so that it is to be understood that FIG. 16 is only a general representation of size and shape.

The faintest and smallest are the reflected-refracted spectral displays, four of which are denoted by the reference characters 124A1 through 124A4 in FIG. 17. Again, each patch is in the general shape of a single column 170 of full-spectrum, rainbow colored segments 170R, 170O, 170Y, 170G, 170B, 170I, and 170V. The patches shown in FIG. 17 emanate from the junctures A1, A2, A3, and A4 of primary prisms 80-1 to 80-4 and the secondary prism 90-A. As with the main and refracted-refracted patches, the reflected-refracted patches change their shapes and sizes and move along with their displays, as 124, as a function of the angle of incidence of the sun or other light source, and FIG. 17 shows these parameters in general only.

The principles of the subject method and apparatus and in particular the operation of the subject apparatus 25 have been explained above. Now, by way of a summary and to describe in one view, the overall effect of the method and of the use of the apparatus, reference is made to FIG. 18. This figure is a schematic view intended to show how multiple patches of full-spectrum colors are produced at widely distributed locations by the present invention. It is not intended to show exact shapes, sizes or positions of the patches, since these parameters vary constantly as the sun rises and sets. It is assumed that the apparatus placed on the sill of a window, as 104 (FIG. 11), with the bottom panel 54 resting on the sill and with the primary prism group 80 facing out-of-doors. When, for example, the mid-morning or mid-afternoon sun 106 shines on the apparatus, the four main spectral patches 120-1,120-2, 120-3, and 120-4 (FIG. 18) are projected onto the front wall 108 (FIG. 11) of the room 102. In addition, three groupings of four, that is twelve in all, refracted-refracted spectral patches 122A1–122A4, 122B1–122B4, and 122C1–122C4 are projected onto the left side wall 112; and three groupings of four, that is twelve in all, refracted-refracted spectral patches 126A1–126A4, 126B1–126B4, and 126C1–126C4 are projected onto the right side wall 114. Furthermore, three groupings of four, that is twelve in all, reflected-refracted spectral patches 124A1–124A4, 124B1–124B4, and 124C1–124C4 are projected onto the left side wall 112 below the refracted-refracted display 122; and three groupings of four, that is twelve in all, reflected-refracted spectral patches 126A1–126A4, 126B1–126B4, and 126C1–126C4 are projected onto the right side wall 114 below the refracted-refracted display 126.

It will thus be evident in FIG. 18 that the numbers 1, 2, 3, and 4 in the smaller boxes inside the larger box 120 identify the primary prisms (80)-1, -2, -3, and -4 from which the main refracted spectral patches originate. Similarly, the letter-number combinations or coordinates A1–A4, B1–B4, and C1–C4 identify the junctures 95 from which the refracted-refracted and the reflected-refracted spectral patches originate.

If necessary and desired by a user, individual patches (FIG. 18) may be adjusted somewhat in location by rotating particular prisms 30. For example, the main spectral patch 120-1 can be moved up or down on the wall 116 (FIGS. 11 and 18) by rotating the primary prism 80-1 a few degrees one way or the other. As another example, the refracted-refracted spectral patches 126A1–A4 can be moved back and forth on the wall 114 by rotating the secondary prism 90-A a few degrees one way or the other.

Figure 11:
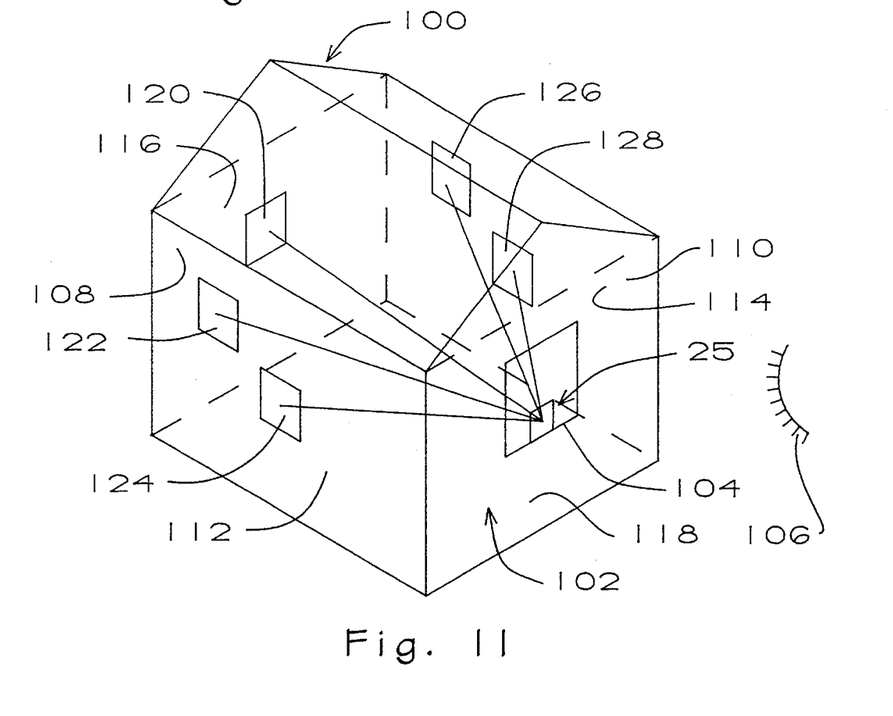
FIG. 11 is an isometric schematic outline of a building showing how the spectral displaying apparatus of the present invention may be used, it being understood that the building is to be thought of as being transparent so as to be able to see inside.
Figure 12:
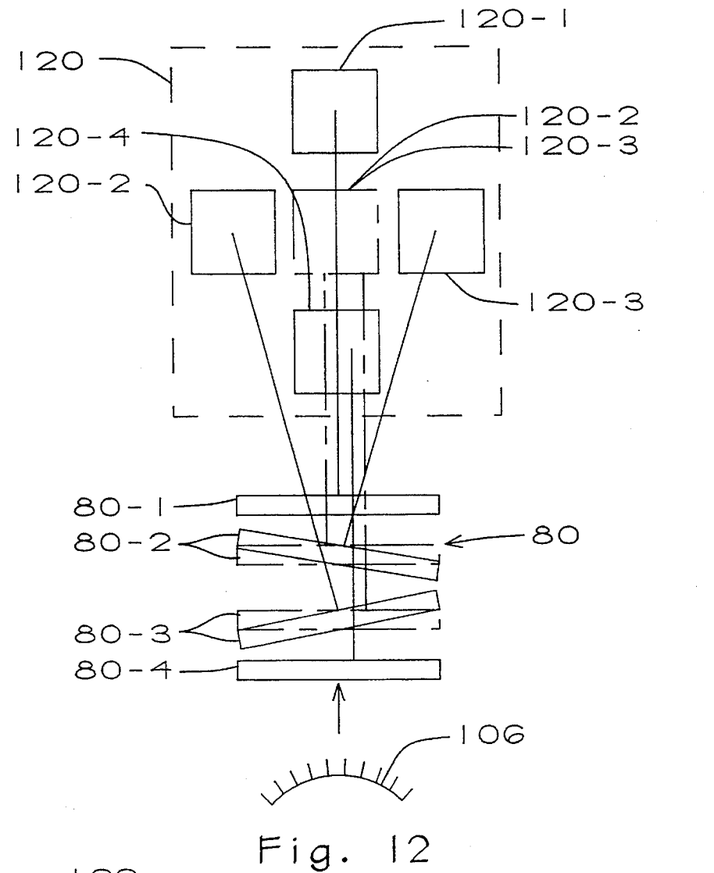
FIGS. 12, 13 and 14 are schematic views illustrating certain principles of operation of the subject apparatus.

With the 3×4 design shown, fifty-two independent, spectral patches (FIG. 18) of full spectrum rainbow colors are projected to multiple locations in a room, as 102 (FIG. 11 ). There are the four main refracted spectral patches 120-1 to 120-4 (FIG. 18) from the primary prisms 80-1 to 80-4. Then, since each juncture 95 produces four patches (two refracted-refracted and two reflected-refracted patches), and the 4×3 design has twelve junctures, there are forty-eight total refracted-refracted and reflected-refracted patches 122 A1–A4, B1–B4, C1–C4; 124 A1–A4, B1–B4, C1–C4; 126 A1–A4, B1–B4, C1–C4; and 128 A1–A4, B1–B4, C1–C4. As previously described, these patches are of different intensity, and change their shape and size and move across the walls (including floor and ceiling as noted) as the sun moves across the sky. Moreover, the patches appear on at least three of the walls of the room and at times bridge the walls and ceiling or walls and floor, depending on the location of the sun. A viewer in the room thus has sensation of being nearly surrounded by a moving and changing display of rainbow colors.

Figure 19:
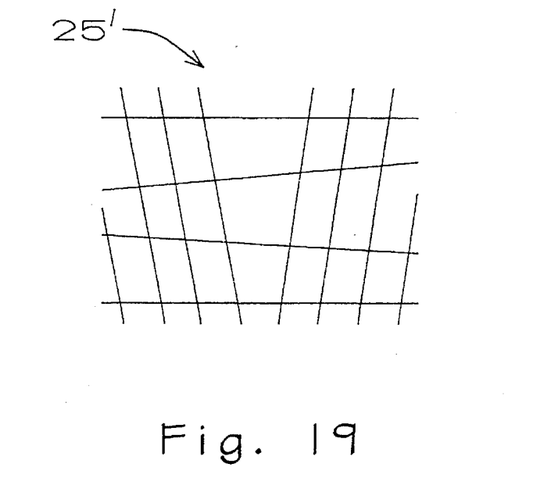
FIGS. 19, 20, and 21 are schematic views showing how the principles of the present invention are applied to embodiments of the invention which differ from the embodiment of FIG. 1.
Figure 20:
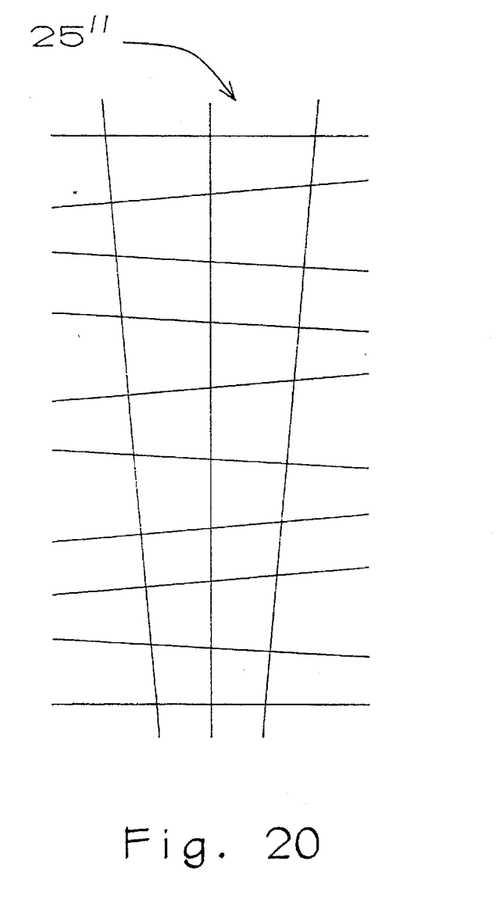
Figure 21:
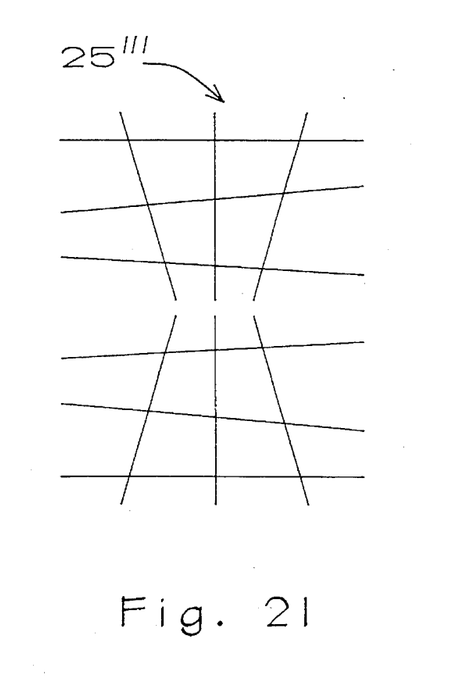

The described embodiment shown in FIG. 1 is a 3×4 design, as noted, but the principles of the invention are not limited to this design. FIGS. 19–21 are examples in schematic form of a few other designs 25', 25", and 25''' using the principles of the present invention, as will be readily understood. As FIGS. 19–21 show, the prisms in one group may be of a different length from the prisms in the other group; the prisms in a group may differ in length; more than two groups of prisms can be employed; and the grid pattern of the prisms can be varied. In addition, the frame 28 need not be square or rectangular, but may be circular or other shapes. It will be thus understood that many variations of the apparatus 25 are possible. In addition, although the source of the incident light is conveniently the sun, other sources of incident light can be employed as will be understood. These other sources of light can be made movable like the sun or made stationary to stabilize the displays.

From the foregoing, it will be understood that the present invention provides for the projection of multiple patches of full spectrum colors to widely distributed, multiple locations. Important concepts of the invention enable the displays of patches to be separated from each other and the patches in each display to be separated from other patches in that display. Utilizing these principles, an apparatus is shown and described which is capable of displaying such patches on a surface area, for example the walls, ceiling, and floor of a room, from sunlight entering through a window in the room. The large numbers of rainbow colored patches displayed all around the room on at least three sides of a viewer create a very special and pleasing effect. Moreover, these displays present an ever-changing scene as the sun moves through the sky. By varying the design, the number of patches can be varied, as desired.

Although preferred embodiments have been shown and described, various modifications and substitutions may be made thereto without departing from the spirit and scope of the invention. Accordingly, it is to be understood that the present invention has been described by way of illustration and not limitation.

What is claimed is:

1. An apparatus for displaying spectral patches on a surface area toward which a source of light is directed comprising first means for converting light from the source of light into a first plurality of spectral patches and for projecting and displaying the patches of said first plurality of patches onto said surface area; and second means for converting part of the converted light from said first converting means into a second plurality of spectral patches, for projecting the spectral patches of said second plurality in a plurality of different directions, and for displaying the patches of said second plurality on said surface area.

2. The apparatus of claim 1 wherein said first means is capable of projecting the spectral patches converted thereby onto said surface area at a predetermined location, and wherein said second means is capable of projecting the spectral patches converted thereby onto said surface area at locations spaced from each other and from said predetermined location.

3. The apparatus of claim 2 wherein said first means is a plurality of transparent prisms each having refracting faces radially spaced from an axis of their respective prism, and said prisms being in adjacent, spaced, side-by-side relationship to each other; and wherein said second means is a plurality of transparent prisms each having refracting and reflecting faces radially spaced from an axis of their respective prism, said prisms being in adjacent, spaced, side-by-side relation to each other and oriented transversely of the prisms of said first means.

4. The apparatus of claim 3 wherein the prisms of the first means are oriented generally horizontally.

5. The apparatus of claim 3 wherein the prisms of the first means include intermediate prisms whose axes are in divergent-convergent relationship and an outside prism on one side of the intermediate prisms, the axis of the outside prism being substantially horizontal; and wherein the prisms of the second means include an intermediate prism and outside prisms on opposite sides of the intermediate prism of the second means and whose axes are in divergent-convergent relationship with each other.

6. An apparatus for projecting multiple spectral patches comprising first means for refracting light so that a part thereof projects a display of refracted spectral patches, second means for refracting a part of the refracted light from the first means so as to project doubly refracted spectral patches, and third means for reflecting another part of the refracted light from the first means so as to project a display of reflected-refracted spectral patches.

7. The apparatus of claim 6 wherein the apparatus is capable of projecting said patches to multiple locations, said first means is capable of projecting a plurality of once-refracted spectral patches to a first location where they are distinguishable from each other, and said second and third means each being capable of projecting a plurality of reflected-refracted spectral patches and refracted-refracted spectral patches to locations different from each other and from said first location where the patches are distinguishable from each other and from the once-refracted patches.

8. The apparatus of claim 6 wherein said first means projects the refracted spectral patches to an intermediate location, wherein said second means projects reflected-refracted spectral patches to locations on both sides of said intermediate location, and wherein said third means projects said refracted-refracted spectral patches to locations on both sides of said intermediate location but different from the locations of said reflected-refracted spectral patches.

9. An apparatus for displaying spectra on a plurality of surfaces which are located in front and laterally of the apparatus comprising first and second groups of prisms, each prism being translucent and having angularly related faces spaced radially from a longitudinal axis of its prism, and means mounting the prisms so that the first group of prisms is in opposed spaced relation to the second group of prisms, so that the axes of the prisms in the first group are transverse to the axes of the prisms in the second group, and so that when light is directed at the first group of prisms, it is refracted by prisms in the first group and both refracted and reflected by prisms in the second group and thereby projected in a plurality of spectral patches in dispersed locations on said display surfaces.

10. The apparatus of claim 9 wherein each prism is made of optical glass or optical grade plastic.

11. An apparatus for displaying spectra on the walls of a room having a window through which the sun's rays are transmitted when the sun is shining, comprising a frame adapted to be placed in such a window; a primary group of elongated prisms mounted in the frame with their axes extending generally horizontally, and so as to be exposed to the sun's rays when the sun is shining, there being at least four prisms in said primary group arranged in side-by-side relation to each other so as to define at least one pair of upper and lower prisms and a pair of intermediate prisms, said upper and lower prisms being substantially horizontal and said intermediate prisms being in a convergent-divergent relationship to each other whereby light passing through the primary prisms is refracted into a plurality of spectral patches on a wall of the room in from of the prisms; and a secondary group of elongated prisms mounted in the frame in opposed relation to the prisms in the primary group with the axes of the secondary prisms extending generally vertically, there being at least three prisms in the secondary group arranged in side-by-side relation to each other so as to define a pair of outside prisms and an intermediate prism, said intermediate secondary prism being substantially vertical and said outside prisms being in a convergent-divergent relationship to each other whereby refracted light from the primary prism is both reflected and refracted by the secondary prisms into a plurality of spectral patches on walls of the room which are on opposite sides of the prisms.

12. An apparatus for projecting multiple spectral patches comprising a first group of light refracting members each having an axis and light refracting faces spaced about its axis, a second group of light refracting and reflecting members each having an axis and light refracting and reflecting faces spaced about its axis, and means mounting the groups in a grid pattern so that the first group of members is in opposed spaced relation to the second group of members and so that the axes of the second group of members are transverse to the axes of the first group of members whereby the members of the second group overlap the members of the first group to define a plurality of overlapping junctures each of which is identified with a spectral patch refracted or reflected from a member in the second group when light is directed at the members in the first group.

13. A light projecting apparatus, comprising: a plurality of elongated primary prisms of optical material having a generally common orientation, and a plurality of elongated secondary prisms of optical material positioned in opposed, spaced, overlapping relation to the primary prisms and having a generally common orientation transverse to the orientation of the primary prisms, each of said prisms being capable of refracting light which passes through the prism and of reflecting light incident to the prism, certain of said primary prisms being angularly related to the other primary prisms, and certain of said secondary prisms being angularly related to the other secondary prisms.

14. The apparatus of claim 13 wherein each of said prisms has an axis, wherein light is reflected and refracted from the prism generally perpendicularly to the axis of the prism, and wherein one or more of said prisms is rotatably adjustable about its axis.

15. The apparatus of claim 13 wherein there are at least four primary prisms including a pair of intermediate prisms in convergent-divergent relation to each other and a pair of outside prisms generally parallel to each other but angularly related to and on opposite sides of the intermediate prisms, and wherein there are at least three secondary prisms including an intermediate prism and a pair of outside prisms in convergent-divergent relation to each other on opposite sides of the intermediate secondary prism.

16. The apparatus is claim 15 where said intermediate secondary prism is generally perpendicular to the outside primary prism.

17. The apparatus of claim 13 wherein the prisms are elongated and have triangular cross sections, wherein the prisms in the primary group are in generally the same plane with each other, and wherein the prisms in the secondary group are in generally the same plane with each other, said planes being in spaced, generally parallel relation to each other.

18. A method of projecting multiple patches of full-spectrum rainbow colors to multiple locations, comprising the steps of refracting solar light to produce a first rainbow-colored display at a first location, refracting again part of the initially refracted light to produce a second rainbow-colored display at second and third locations relatively adjacent to and on opposite sides of the first location, and reflecting another part of the initially refracted light to produce a third rainbow-colored display at said second and third locations but spaced from said second display.

19. The method of claim 18 wherein each of said refracting and reflecting steps is performed to produce a multiplicity of their respective displays.

20. The method of claim 19 wherein the first refracting step produces a plurality of spaced rainbow-colored patches on the first location, wherein the second refracting step produces a plurality of spaced rainbow-colored patches on each of said second and third locations, and wherein the reflecting step produces a plurality of rainbow-colored patches on each of said second and third locations which are spaced from each other and from the spectral patches produced by the second refracting step.

21. The method of claim 18, including the further step of causing each display to change its position at its location while maintaining its location relative to the locations of the other displays.

22. The method of claim 18 including the further step of adjusting the angle at which light is projected to selected locations.

23. An apparatus for projecting multiple patches of full-spectrum rainbow colors to multiple locations, comprising:

means for refracting light to produce a first rainbow-colored display at a first location, means for refracting again part of the initially refracted light to produce a second rainbow-colored display at second and third locations relatively adjacent to and on opposite sides of the first location, and means for reflecting another part of the initially refracted light to produce a third rainbow-colored display at said second and third locations but spaced from said second display.

24. An apparatus for projecting multiple patches of full-spectrum rainbow colors to multiple locations, comprising:

a first group of elongated transversely spaced prisms of optical material, lying in substantially the same plane with their longitudinal dimensions having generally the same orientation; and a second group of elongated transversely spaced prisms, of optical material located in a generally common plane which is substantially parallel to the plane of the first group of prisms with the longitudinal dimensions of the prisms in the second group being oriented transversely of the prisms of the first group and being in opposed spaced relation thereto.

* * * * *